US009607340B2

(12) United States Patent
Setayesh et al.

(10) Patent No.: US 9,607,340 B2
(45) Date of Patent: Mar. 28, 2017

(54) METHOD AND SYSTEM FOR IMPLEMENTING AUTHOR PROFILING

(71) Applicant: Oracle International Corporation, Redwood Shores, CA (US)

(72) Inventors: Mehrshad Setayesh, Lafayette, CO (US); Timothy P. McCandless, Boulder, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 91 days.

(21) Appl. No.: 13/795,699

(22) Filed: Mar. 12, 2013

(65) Prior Publication Data

US 2014/0280168 A1     Sep. 18, 2014

(51) Int. Cl.
    G06F 17/30    (2006.01)
    G06Q 50/00    (2012.01)
    G06Q 10/10    (2012.01)

(52) U.S. Cl.
    CPC ............. G06Q 50/01 (2013.01); G06Q 10/10 (2013.01); G06F 17/30598 (2013.01)

(58) Field of Classification Search
    USPC ........................................................ 707/739
    See application file for complete search history.

(56) References Cited

U.S. PATENT DOCUMENTS

| | | | | |
|---|---|---|---|---|
| 7,289,949 B2 * | 10/2007 | Warner | ............... | G06F 17/271 704/9 |
| 8,626,835 B1 * | 1/2014 | Gyongyi | ............ | G06F 17/30598 709/204 |
| 8,769,576 B2 * | 7/2014 | Burkitt | ............... | G06F 17/30817 725/40 |
| 8,775,429 B2 * | 7/2014 | Choudhary | ......... | G06Q 30/0201 707/738 |
| 8,930,384 B2 * | 1/2015 | Sommer | ............ | G06F 17/30979 707/722 |
| 2003/0135499 A1 * | 7/2003 | Schirmer | ........... | G06F 17/30616 |
| 2008/0256093 A1 * | 10/2008 | Amitay | .............. | G06F 17/30675 |
| 2010/0211868 A1 * | 8/2010 | Karmarkar | ......... | H04M 1/72547 715/234 |
| 2011/0066613 A1 * | 3/2011 | Berkman | ........... | G06F 17/30702 707/734 |
| 2011/0072052 A1 * | 3/2011 | Skarin | ..................... | G06Q 10/10 707/794 |

(Continued)

OTHER PUBLICATIONS

Non-final Office Action dated Apr. 8, 2015 for related U.S. Appl. No. 13/795,802.

(Continued)

*Primary Examiner* — Amresh Singh
*Assistant Examiner* — Edward Jacobs
(74) *Attorney, Agent, or Firm* — Vista IP Law Group, LLP (57) ABSTRACT

Disclosed is an improved method, system, and computer program product for analyzing interests of consumers, where semantic analysis is performed on writings by authors on social media sites. The results of the semantic analysis provide a profile of the authors. These author profiles can be used to identify and correlate topical interests by consumers. An enterprise or business can more effectively market to the consumers based upon this knowledge of the consumers' interests.

29 Claims, 5 Drawing Sheets

(56) References Cited

U.S. PATENT DOCUMENTS

| | | | | |
|---|---|---|---|---|
| 2011/0213785 A1* | 9/2011 | Kristiansson | G06Q 10/10 | 707/748 |
| 2011/0246378 A1* | 10/2011 | Prussack | G06F 17/2785 | 705/310 |
| 2012/0030210 A1* | 2/2012 | Sankhla | G06F 17/30699 | 707/741 |
| 2012/0047219 A1* | 2/2012 | Feng | G06F 17/3071 | 709/207 |
| 2012/0191644 A1* | 7/2012 | Carter | G06F 17/3089 | 707/608 |
| 2012/0215844 A1* | 8/2012 | Ferlez | G06Q 10/10 | 709/204 |
| 2012/0278387 A1* | 11/2012 | Garcia | G06Q 50/01 | 709/204 |
| 2012/0290399 A1* | 11/2012 | England | G06Q 30/0282 | 705/14.66 |
| 2012/0324004 A1* | 12/2012 | Le | G06Q 10/00 | 709/204 |
| 2013/0018896 A1* | 1/2013 | Fleischman | G06Q 50/01 | 707/748 |
| 2013/0046579 A1* | 2/2013 | Feiks | G06Q 10/0637 | 705/7.31 |
| 2013/0054667 A1* | 2/2013 | Mahajan | G06Q 30/0251 | 709/201 |
| 2013/0097176 A1* | 4/2013 | Khader | G06Q 30/0282 | 707/748 |
| 2013/0179440 A1* | 7/2013 | Gordon | G06Q 30/02 | 707/731 |
| 2013/0191394 A1* | 7/2013 | Bradley | G06F 17/30598 | 707/738 |
| 2013/0246430 A1* | 9/2013 | Szucs | G06F 17/30011 | 707/738 |
| 2013/0275429 A1* | 10/2013 | York | G06F 17/30029 | 707/737 |
| 2014/0052718 A1* | 2/2014 | Waupotitsch | G06F 17/30 | 707/728 |
| 2014/0136323 A1 | 5/2014 | Zhang et al. | | |
| 2014/0172855 A1* | 6/2014 | Arnoux | G06F 17/30598 | 707/737 |
| 2014/0278769 A1 | 9/2014 | Mccandless et al. | | |
| 2014/0280525 A1 | 9/2014 | Mccandless et al. | | |

OTHER PUBLICATIONS

Third Party Submission pursuant to 35 USC 122(e) and 37 CFR 1.290 filed on Sep. 23, 2014, in related U.S. Appl. No. 13/795,895.
Non-final Office Action dated Mar. 25, 2015 for related U.S. Appl. No. 13/795,895.
Final Office Action dated Oct. 8, 2015 for related U.S. Appl. No. 13/795,895.
Final Office Action dated Oct. 22, 2015 for related U.S. Appl. No. 13/795,802.
Notice of Allowance and Fee(s) dated Apr. 25, 2016 for related U.S. Appl. No. 13/795,895.
Non-Final Office Action dated Jul. 1, 2016 for related U.S. Appl. No. 13/795,802.
Final Office Action dated Jan. 4, 2017 for related U.S. Appl. No. 13/795,802.

* cited by examiner

METHOD AND SYSTEM FOR IMPLEMENTING AUTHOR PROFILING

BACKGROUND

If businesses are able to obtain an accurate assessment about the interests held by consumers, then the businesses can act upon that knowledge to more effectively market products and services to those consumers. For example, accurate information about topics and subjects of interest to consumers can be to create sales leads or more targeted advertising to the consumers.

One possible way to obtain this information is to ask consumers to fill out surveys and to then use the survey responses to target the consumers having interests in particular products and services.

However, there are numerous known problems with this approach. First, many surveys tend to have low response rates. In addition, consumers may not necessarily respond honestly or comprehensively to the survey questions, causing concerns about the accuracy of the survey results. Also, surveys are often targeted at certain demographic groups of consumers, which may erroneously pre-filter other consumers that should be included within the target audience for the business.

Therefore, there is a need for an improved approach to perform analysis of possible consumers for businesses and enterprises.

SUMMARY

Embodiments of the present invention provide an improved system, method, and computer program product for analyzing interests of consumers. Semantic analysis is performed on writings by authors on social media sites. The results of the semantic analysis provide a profile of the authors. These author profiles can be used to identify and correlate topical interests by consumers. An enterprise or business can more effectively market to the consumers based upon this knowledge of the consumers' interests.

Other additional objects, features, and advantages of the invention are described in the detailed description, figures, and claims.

DETAILED DESCRIPTION

Given the widespread availability and usage of the internet by consumers, many businesses have become interested in being able to effectively monitor the content and commentary provided by such consumers. Interactive websites such as social networks and blogs provide a wealth of useful information that can be advantageously used by a business. Therefore, it would be very useful to provide an effective mechanism to allow businesses and enterprise business applications to interact with and take action upon data that originate from online sources of social data and commentary.

The present disclosure is directed to an approach for allowing a business entity to access and integrate with social media data. The invention is capable of accessing data across multiple types of internet-based sources of social data and commentary and to perform semantic analysis upon that data. Semantic analysis is performed on writings by authors on social media sites. The results of the semantic analysis provide a profile of the authors. These author profiles can be used to identify and correlate topical interests by consumers. An enterprise or business can more effectively market to the consumers based upon this knowledge of the consumers' interests.

Figure 1:
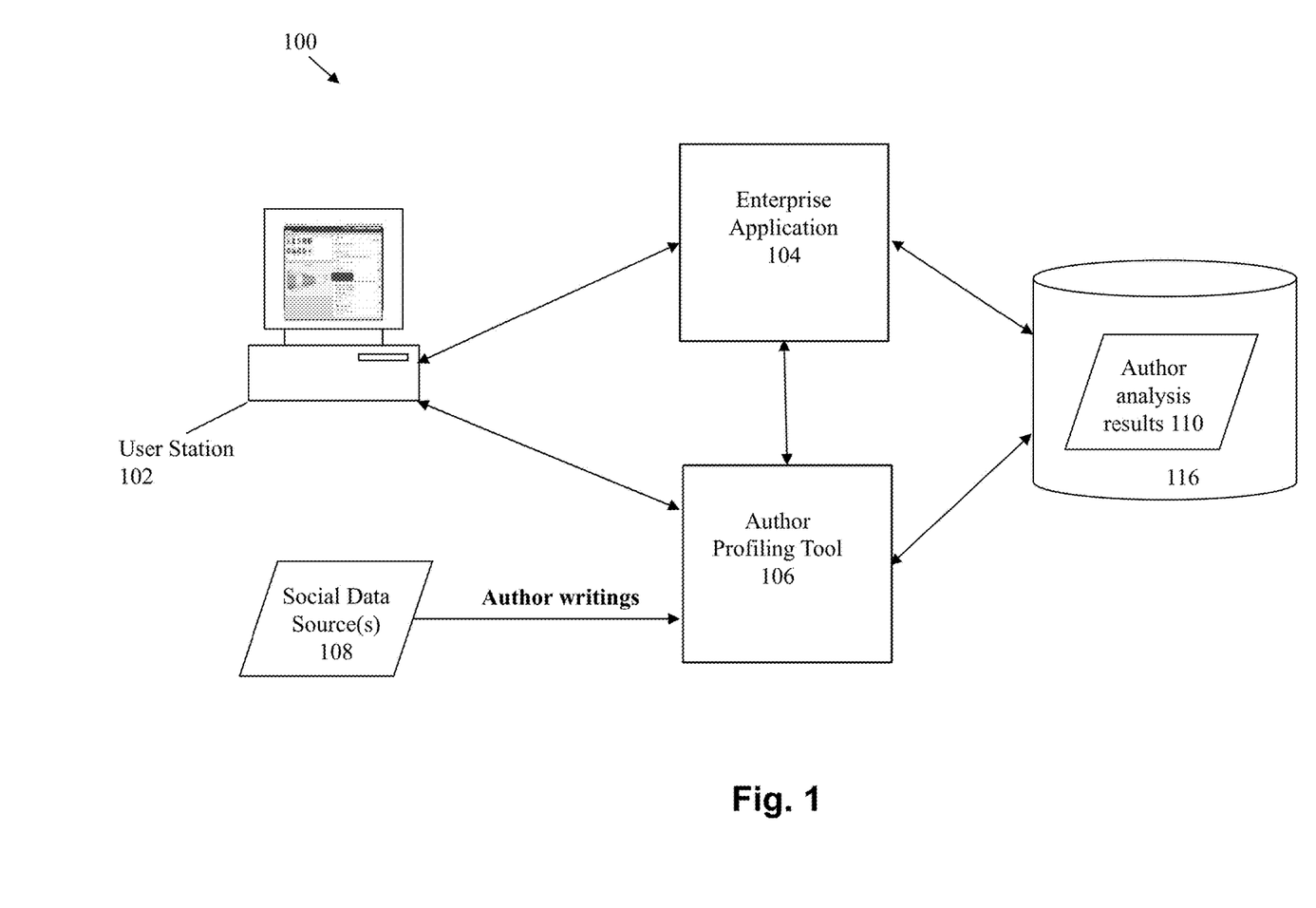
FIG. 1 illustrates a system to implement author profiling according to embodiments of the invention.

FIG. 1 illustrates an example system 100 which may be employed in some embodiments of the invention to implement author profiling. The system includes one or more users at one or more user stations 102 that operate the author profiling tool. The user station 102 comprises any type of computing station that may be used to operate or interface with the applications in the system. Examples of such user stations 102 include, for example, workstations, personal computers, or remote computing terminals. The user station 102 comprises a display device, such as a display monitor, for displaying a user interface to users at the user station. The user station 102 also comprises one or more input devices for the user to provide operational control over the activities of the system, such as a mouse or keyboard to manipulate a pointing object in a graphical user interface to generate user inputs to an enterprise application 104 and/or author profiling tool 106.

The author profiling tool 106 provides a framework for analyzing writings generated by authors on social media sites. The author profiling tool 106 receives data from one or more online social data sources. Such social data sources include, for example, websites such as a social network, blog or web feed (e.g., Facebook, Twitter, Blogger, and RSS). The content may include one or more comments (e.g., Facebook comment, comment to a blog post, reply to a previous comment) or uploaded postings (e.g., images and associated metadata, text, rich media, URLs) at one or more sources. The social data/content may therefore comprise a variety of forms and/or types.

Semantic analysis, classification, and filtering are performed upon the author writings. Essentially, the writings of the authors are reviewed to identify the topics and subjects of the author's works. This type of analysis can then be performed for multiple authors, where authors having similar analysis vectors are grouped together. Actionable data can then be identified based upon the analysis results.

According to some embodiments, integration is provided between the author profiling tool 106 and an enterprise application 104. The enterprise application 104 comprises any business-related application that provides visibility and control over various aspects of a business. Such enterprise/business applications can include, without limitation, customer relations management ("CRM") applications, enterprise resource planning ("ERP") applications, supply chain management applications, and other applications dealing with various finance, accounting, manufacturing, human resources, and/or distribution functions, to name but a few examples. Exemplary enterprise application suites include, without limitation, Oracle Fusion, Oracle eBusiness Suite and JD Edwards Enterprise One, all of which are available from Oracle Corporation of Redwood Shores, Calif.

For the purposes of explanation, one or more embodiments are illustratively described with reference to CRM applications. It is noted, however, that the invention may be applied to other types of enterprise applications as well, and is not to be limited to CRM applications unless explicitly claimed as such.

The analysis results 110 are stored into a database in a computer readable storage device 116. The computer readable storage device comprises any combination of hardware and software that allows for ready access to the data that is located at the computer readable storage device. For example, the computer readable storage device could be implemented as computer memory operatively managed by an operating system. The computer readable storage device could also be implemented as an electronic database system having storage on persistent and/or non-persistent storage.

Figure 2:
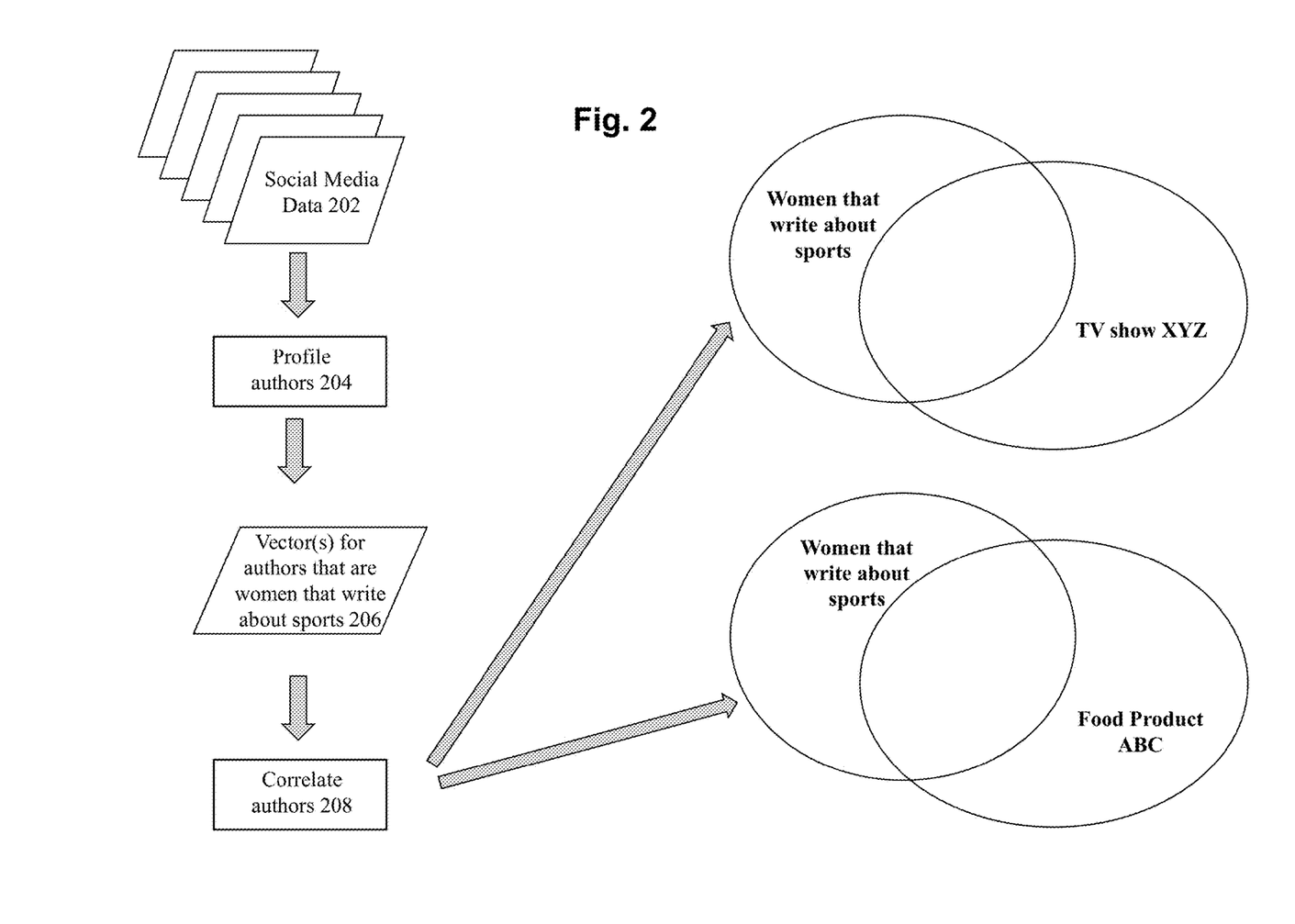
FIG. 2 illustrates a process for analyzing author writings according to embodiments of the invention.

FIG. 2 shows an illustrative example of how author profiling can be used to generate analysis results. The process begins by acquiring author writings 202 from one or more social network systems, e.g., from public blog sites, twitter messages, RSS data, and social media sites such as Facebook. In some embodiments, the data that is received for processing may include non-social data. Such data includes, for example, non-social data (e.g., email, chats, transcribed phone conversations, transcribed videos).

Author profiling is performed upon the received data at 204. Semantic analysis is performed upon the received data to implement author profiling. For example, latent semantic analysis (LSA), an advanced form of statistical language modeling, can be used to perform semantic analysis upon the author writings. This permits the system to understand the contextual and semantic significance of terms that appear within the social data. For example semantic analysis can be used to understand the difference between the term "Galaxy" used in the author writing for astronomy content, and "Galaxy" in the author writing to refer to the name of a professional soccer team.

The system performs semantic analysis and classification to the social media data to create and identify themes, and to cluster together like-minded messages, topics, conversations, and content from the authors. This action is performed by categorizing the subjects of the author writings.

Strength numbers may be formed and associated with the different categories. The strength numbers indicate the extent or degree of affinity and/or interest by the author for any particular subject relative to other subjects. Using these strength numbers, a vector can therefore be defined for each author that establishes a profile of the interest for that author.

In some embodiments, the social data content is subject to semantic filtering to reduce the excess "noise" of irrelevant data. Semantic filtering is a mechanism that is provided to minimize miss-categorizations of the social data. Much of the social data is likely to contain content which is of very little interest. Semantic filtering is used to remove the irrelevant material from the social data to reduce the occurrence of false positives, false negatives, and inappropriate responses/rejections within the actionable data. This permits the resulting data to be more relevant and accurate.

The profiling process is repeated for numerous authors identified from the social media sources. At the end of this process, the analysis results will include vector data for numerous authors, where the vectors indicate the affinities between the authors pertaining to common topics or subjects.

For example, it may be of interest for businesses to know about the demographic class of consumers that are female authors who write messages on social media about sports. In this case, the author vectors 206 can be used to identify the authors having an affinity for this subject. Thus, in one embodiment of the invention, a business may pre-configure these types of topics, and the author profiles are used to search for authors that correspond to the pre-configured topic categories. In an alternate embodiment, these subject areas are not pre-defined. Instead, the analysis results are reviewed to discover commonality of subject areas based upon the authors' written works.

To illustrate, as shown in FIG. 2, the author profiles may be used to identify a grouping of authors that all correspond to women that tend to write social media messages/postings about sports.

The clustered set of data for these authors can then be analyzed to identify other common areas of interest that may be revealed by the author profiles. By performing correlation analysis 208, it is possible to discover other areas of commonality between these authors. For example, review of the author profiles may reveal that a substantial percentage of these authors also watch the "XYZ" TV show and have shown an interest in the "ABC" food product.

This type of correlation data is quite useful to a business organization. For example, businesses that market the "ABC" food product, or its competition, can use this information to specifically target this demographic group for its marketing campaigns. In addition, since the business knows this demographic group tends to watch the "XYZ" TV show, an effective advertisement campaign may be implemented by purchasing commercial advertisement time for this TV show or by providing advertisements on the website and/or Facebook for the show.

For many reasons, this approach provide much better analysis results when compared against the prior art approach of using surveys. Since the analysis is based upon the authors' own writings, the analysis results will produce much more accurate results when compared to the typical voluntary survey responses. Moreover, the present approach allows analysis to be performed over a very broad proportion of the general public, especially as compared to surveys that tend to have very limited response rates.

In addition, prior art surveys are often targeted at specific demographic groups of consumers, which may erroneously filter out other consumers that should be included within the target audience for a business. The present invention can be directed at the general public, ensuring that the broadest possible group of consumers is included in the analysis results.

The present approach is particularly useful at discovering correlations between consumers, even where those correlations are not known or expected upfront. This is because the semantic analysis and correlation process will cluster like-authors together using the contents of the author's own writings, without pre-conceptions about the subjects of those writings. As such, serendipitous discoveries are likely to occur from the disclosed author analysis.

Figure 3:
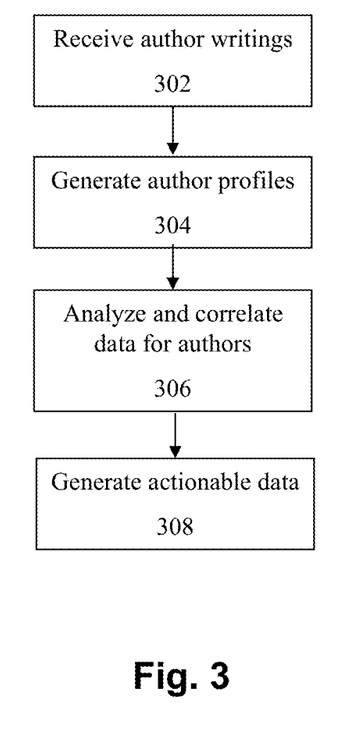
FIG. 3 illustrates a flowchart of an approach to perform author profiling according to embodiments of the invention.

FIG. 3 shows a flowchart of an approach to implement some embodiments of the invention. At 302, the author writings are received for analysis. As noted above, the author writings may be received from any suitable source of the data, including both social media data sources as well non-social sources.

At 304, themes analysis is performed for the writings by the authors. Based upon the semantic analysis and classification, themes are identified within the authors' works. These themes can be used to establish profiles for the authors.

At 306, the author profiles are analyzed to identify correlations between the different authors. For example, authors that have written about similar topics may be reviewed to identify other areas of commonality between those authors.

At 308, actionable data is generated for those authors. The actionable data correspond to areas of analytical importance with respect to the specific organizations that will be consuming the results of the system. For example, a business may seek to use the system to analyze author writings to (1) identify sales leads and (2) identify customer relations issues and dissatisfied customers. If these are the business' goals, then at least some of the analysis results will, in some embodiments, correspond to identification of the content that pertain to these categories, e.g., the information can be used to direct sales leads to the appropriate sales department.

The actionable data can be processed using any suitable processing mechanism. In one embodiment, automated processing is performed using a rules and workflow engine. In this approach, a set of rules is provided in a rulebase, where the rules identify how the actionable data should be handled and directed within the organization. The system then dispatches and/or creates the appropriate messages to be sent to destinations within the enterprise. For example, opportunity messages can be sent to a CRM system, where a record is automatically created and/or process in the system for the sales lead. Product data and comments can be provided to ecommerce products and groups. The present invention can therefore be used to provide a framework for integrating a corporate infrastructure to analysis results from the author profiling tool.

Figure 4:
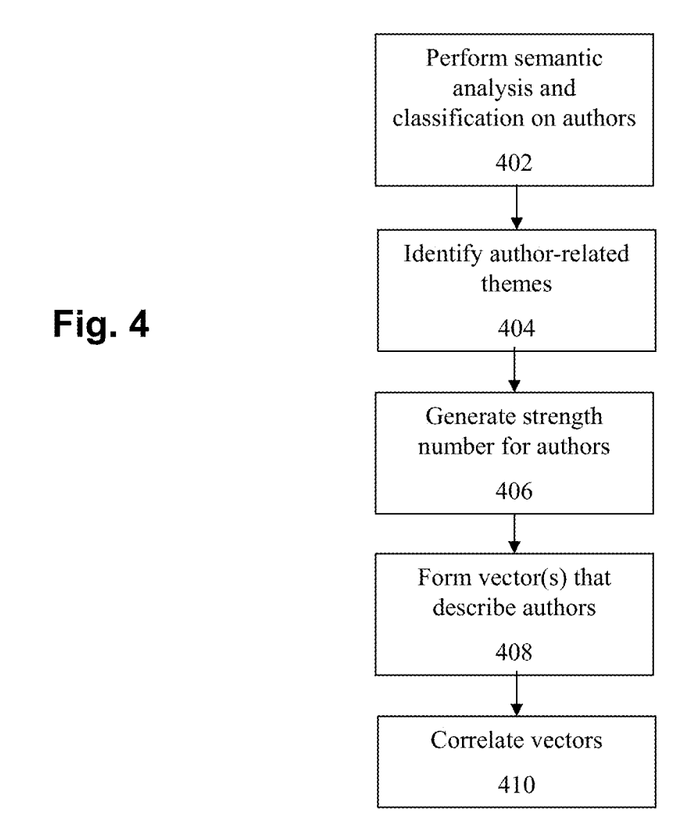
FIG. 4 illustrates a flowchart of an approach to analyze author writings according to embodiments of the invention.

FIG. 4 shows a flowchart of an approach to generate the author profile. At 402, semantic analysis, classification, and filtering are performed upon the author writings. This permits the system to understand the contextual and semantic significance of terms that appear within the social data. Filtering may be applied to remove irrelevant data from the analysis.

At 404, specific themes are identified within the author writings. The themes are identified based upon the topics and subjects revealed from the semantic analysis and classification process. Therefore, categorization is performed upon the subjects of the author writings. At 406, strength numbers are associated with the different categories that correspond to the authors. These strength numbers indicate the relative affinity of each author to a particular topic, subject, or theme.

At 408, a vector can then be defined for each author using the strength numbers for the different categories. The vector establishes a profile of the interests for that author, and can be used to describe and analyze that author with respect to the author's interests.

The author profiles may be used to identify a large grouping of authors that correspond to similar areas of interests. Therefore, at 410, the vectors can be correlated to perform commonality analysis among the authors. As noted above, the results from performing this type of correlation can be very useful to a business organization, e.g., for marketing or customer service purposes.

Therefore, what has been described is an improved system, method, and computer program product for analyzing interests of consumers, where semantic analysis is performed on writings by authors on social media sites. The results of the semantic analysis provide a profile of the authors. These author profiles can be used to identify and correlate topical interests by consumers. An enterprise or business can more effectively market to the consumers based upon this knowledge of the consumers' interests.

System Architecture Overview

Figure 5:
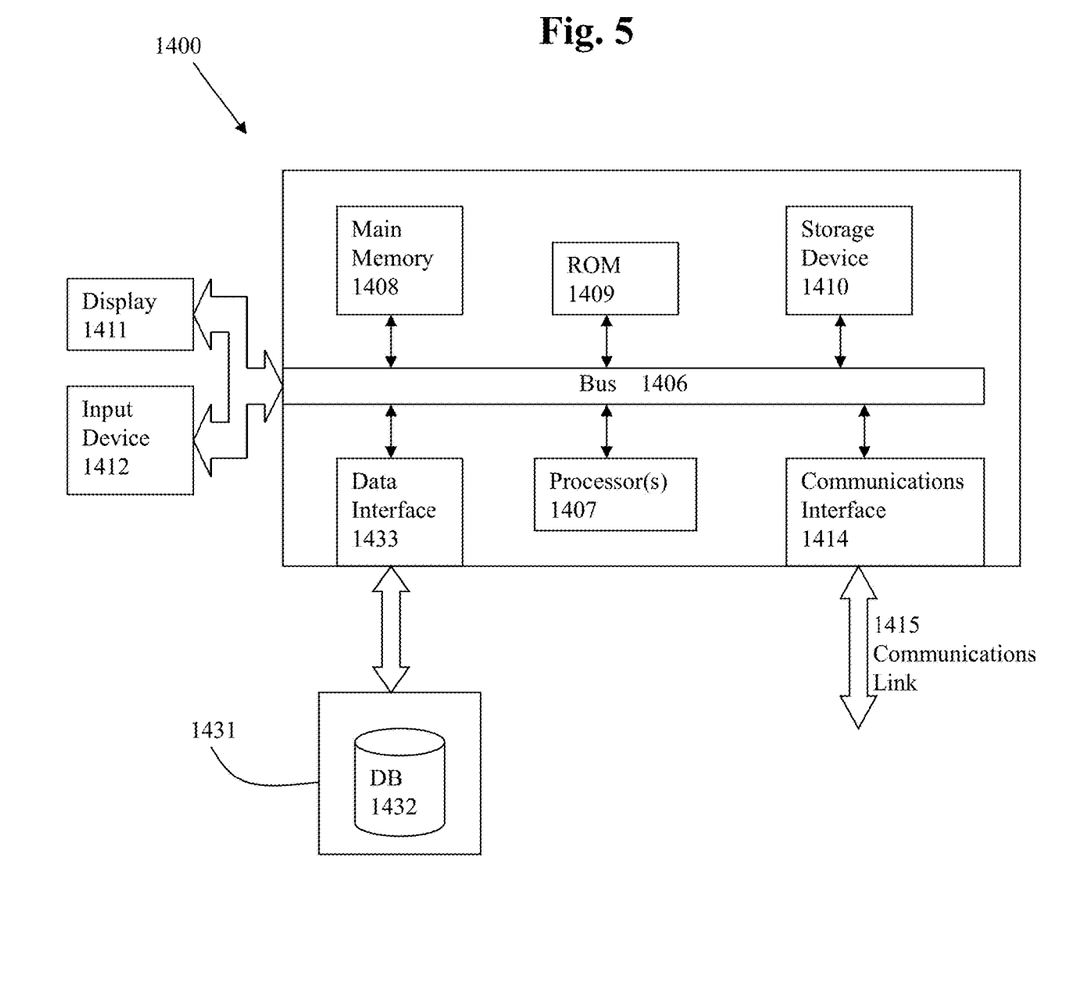
FIG. 5 depicts a computerized system on which an embodiment of the invention can be implemented.

FIG. 5 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control. Computer system 1400 may communicate through a data interface 1433 to a database 1432 on an external storage device 1431.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for analyzing author data, comprising:
receiving writings created by a plurality of authors;
performing a semantic analysis upon the writings;
generating a plurality of author profiles for the writings using results from the semantic analysis, the plurality of author profiles respectively identifying topics of interest to the plurality of authors, and groups of authors being identified from one or more of the topics of interest;
identifying a first group of multiple authors that corresponds to a first topical subject and multiple author profiles for the multiple authors, the first group of multiple authors identified from the groups and corresponding to the multiple author profiles identified from the plurality of author profiles;
identifying a second topical subject shared among at least some authors of the multiple authors in the first group at least by performing a correlation analysis that analyzes at least some author profiles in the multiple author profiles of the at least some authors;
identifying a second group of authors from the plurality of authors that exhibit affinity for the second topical subject at least by identifying author vectors corresponding to the second group of authors with respect to the second topical subject; and
correlating the first group of multiple authors with the second group of authors in response to the identification of the second topical subject, wherein the writings are received from the plurality of authors without targeting specific groups of authors;
classifying the writings into a plurality of classes based in part or in whole upon topics of interests determined by the semantic analysis, classifying the writing including:
creating a set of themes from results of the semantic analysis;
analyzing the set of themes created from the results of the semantic analysis;
determining subjects of the topics of interest based in part or in whole upon the set of themes;
determining similarity among the subjects of the topics of interest at least by analyzing the plurality of author profiles;
clustering the topics of interests into the plurality of classes based in part or in whole upon the similarity among the subjects;
determining respective strength numbers for the plurality of authors, a strength number for a user indicating relative affinity of the user to a category relative to one or more remaining categories;
associating the respective strength numbers that correspond to the plurality of authors with a plurality of categories;
creating a vector for each author of the plurality of authors, wherein vectors for the plurality of authors indicate respective affinities among the plurality of authors to one or more common topics of interests or one or more subjects;
establishing an author profile for the each author by using the vector for the each author;
storing the author profile for the author in the plurality of author profiles;
reducing noise in the writings at least by performing a semantic filtering process;
improving accuracy of the plurality of classes from classifying the writings at least by reducing false positives, false negatives, and inappropriate contents with the semantic filtering process;
identifying an actionable data based in part or in whole upon results of the semantic analysis, wherein the writings created by the plurality of authors include contents transcribed from non-social data;
determining, at a rule and workflow module stored at least partially in memory, the plurality of computing systems to receive the actionable data based in part or in whole upon a set of rules that identifies how the actionable data is to be handled and directed;
performing the semantic analysis upon the writings at least by performing a statistical language modeling;
performing the semantic analysis upon the writings at least by performing a latent semantic analysis;
preconfiguring a plurality of types of topics of interest;
determining a first set of authors that corresponds to the one or more first types of topics of interest at least by analyzing the plurality of author profiles to identify a first set of author profiles corresponding to the first set of authors;
determining commonality of one or more second types of topics of interest without pre-defining the one or more second types of topics of interest;
identifying commonality among the plurality of writings in response to the one or more second types of topics of interest based in part or in whole upon results of the semantic analysis;
identifying a group of authors that corresponds to a first affinity for a first subject;
determining a second affinity and a third affinity shared by at least a threshold percentage of authors of the group of authors at least by analyzing a set of author profiles corresponding to the group of authors and by performing one or more first correlation analyses, wherein the second affinity and the third affinity are not known or expected in advance;
generating correlation data based in part or in whole upon results of determining the second affinity and the third affinity;
generating an action for the group of authors based on the second affinity and the third affinity;
receiving the writings created by the plurality of authors without targeting one or more specific groups of authors;
generating the plurality of author profiles for the writings based in part or in whole upon respective strength numbers for the plurality of authors;
identifying a plurality of themes from the writings based in part or in whole upon results of the semantic analysis and results of classifying the writings;
performing a themes analysis;
generating the plurality of author profiles for the writing based in part or in whole upon the plurality of themes;
determining a first set of actionable data for the plurality of authors based in part or in whole upon results of correlating an at least one group with the authors;
identifying a set of rules from a rulebase;
dispatching, at a rules and workflow engine, actionable data for the plurality of authors to a plurality of computing systems based in part or in whole upon the set of rules, wherein a rule provides how the actionable data is to be dispatched;

determining, at a computer system, contextual and semantic significance in the writings at least by performing classification and filtering on the writings of the plurality of authors;
identifying specific themes within the writings based in part or in whole upon topics and subjects revealed from the semantic analysis and the classification;
performing categorization on the topics and the subjects of the writings to create a number of categories;
associating a set of strength numbers with the number of categories, a strength number indicating relative affinity of each author of the plurality of authors to a particular topic, a particular subject, or a particular theme; and
defining a vector for the each author using at least the set of strength numbers and the number of categories, a vector establishing an author profile for a specific author and being used to describe and analyze the specific author with respect to one or more affinities of the specific author.

2. The method of claim 1, wherein an author profile comprises a vector comprising values for the topics of interest for an author, and the vector comprises strength numbers that correspond to an extent or degree of interest by the author for the topics of interest to the plurality of authors.

3. The method of claim 1, in which the semantic analysis comprises a latent semantic analysis that analyzes contextual and semantic significance of terms that appear within the writings.

4. The method of claim 1, wherein semantic filtering is performed to reduce irrelevant data.

5. The method of claim 1, wherein multiple author profiles in the plurality of author profiles for multiple authors of the plurality of authors are correlated to identify commonality of interests.

6. The method of claim 1, wherein actionable data is generated for a business using the plurality of author profiles, wherein the actionable data is supplied to an enterprise software system, and the enterprise software system comprises at least one of a customer relations management ("CRM") application, an enterprise resource planning ("ERP") application, and a supply chain management application.

7. The method of claim 1, wherein:
the writings are retrieved from a social media system and comprise social media data;
an author profile comprises a vector comprising values for the topics of interest for an author and the vector comprises strength numbers that correspond to an extent or degree of interest by the author for the topics of interest to the plurality of authors;
the semantic analysis comprises a latent semantic analysis that analyzes contextual and semantic significance of terms that appear within the writings;
semantic filtering is performed to reduce irrelevant data;
multiple author profiles of the plurality of author profiles for multiple authors of the plurality of authors are correlated to identify commonality of interests; and
actionable data is generated for a business using the author profile and the actionable data is supplied to an enterprise software system comprising at least one of a customer relations management ("CRM") application, an enterprise resource planning ("ERP") application, and a supply chain management application.

8. A computer program product embodied on a computer readable non-transitory medium, the computer readable non-transitory medium having stored thereon a sequence of instructions which, when executed by a processor causes the processor to execute a method for analyzing author data, the method comprising:
receiving writings created by a plurality of authors;
performing a semantic analysis upon the writings;
generating a plurality of author profiles for the writings using results from the semantic analysis, the plurality of author profiles respectively identifying topics of interest to the plurality of authors;
identifying groups of authors from one or more of the topics of interest;
identifying a first group of multiple authors that corresponds to a first topical subject and multiple author profiles for the multiple authors, the first group of multiple authors identified from the groups and corresponding to the multiple author profiles identified from the plurality of author profiles;
identifying a second topical subject shared among at least some authors of the multiple authors in the first group at least by performing a correlation analysis that analyzes at least some author profiles in the multiple author profiles of the at least some authors;
identifying a second group of authors from the plurality of authors that exhibit affinity for the second topical subject at least by identifying author vectors corresponding to the second group of authors with respect to the second topical subject; and
correlating the first group of multiple authors with the second group of authors in response to the identification of the second topical subject, wherein the writings are received from the plurality of authors without targeting specific groups of authors;
classifying the writings into a plurality of classes based in part or in whole upon topics of interests determined by the semantic analysis, classifying the writing including:
creating a set of themes from results of the semantic analysis;
analyzing the set of themes created from the results of the semantic analysis;
determining subjects of the topics of interest based in part or in whole upon the set of themes;
determining similarity among the subjects of the topics of interest at least by analyzing the plurality of author profiles;
clustering the topics of interests into the plurality of classes based in part or in whole upon the similarity among the subjects;
determining respective strength numbers for the plurality of authors, a strength number for a user indicating relative affinity of the user to a category relative to one or more remaining categories;
associating the respective strength numbers that correspond to the plurality of authors with a plurality of categories;
creating a vector for each author of the plurality of authors, wherein vectors for the plurality of authors indicate respective affinities among the plurality of authors to one or more common topics of interests or one or more subjects;
establishing an author profile for the each author by using the vector for the each author;
storing the author profile for the author in the plurality of author profiles;
reducing noise in the writings at least by performing a semantic filtering process;

improving accuracy of the plurality of classes from classifying the writings at least by reducing false positives, false negatives, and inappropriate contents with the semantic filtering process;

identifying an actionable data based in part or in whole upon results of the semantic analysis, wherein the writings created by the plurality of authors include contents transcribed from non-social data;

determining, at a rule and workflow module stored at least partially in memory, the plurality of computing systems to receive the actionable data based in part or in whole upon a set of rules that identifies how the actionable data is to be handled and directed;

performing the semantic analysis upon the writings at least by performing a statistical language modeling;

performing the semantic analysis upon the writings at least by performing a latent semantic analysis;

preconfiguring a plurality of types of topics of interest;

determining a first set of authors that corresponds to the one or more first types of topics of interest at least by analyzing the plurality of author profiles to identify a first set of author profiles corresponding to the first set of authors;

determining commonality of one or more second types of topics of interest without pre-defining the one or more second types of topics of interest;

identifying commonality among the plurality of writings in response to the one or more second types of topics of interest based in part or in whole upon results of the semantic analysis;

identifying a group of authors that corresponds to a first affinity for a first subject;

determining a second affinity and a third affinity shared by at least a threshold percentage of authors of the group of authors at least by analyzing a set of author profiles corresponding to the group of authors and by performing one or more first correlation analyses, wherein the second affinity and the third affinity are not known or expected in advance;

generating correlation data based in part or in whole upon results of determining the second affinity and the third affinity;

generating an action for the group of authors based on the second affinity and the third affinity;

receiving the writings created by the plurality of authors without targeting one or more specific groups of authors;

generating the plurality of author profiles for the writings based in part or in whole upon respective strength numbers for the plurality of authors;

identifying a plurality of themes from the writings based in part or in whole upon results of the semantic analysis and results of classifying the writings;

performing a themes analysis;

generating the plurality of author profiles for the writing based in part or in whole upon the plurality of themes;

determining a first set of actionable data for the plurality of authors based in part or in whole upon results of correlating an at least one group with the authors;

identifying a set of rules from a rulebase;

dispatching, at a rules and workflow engine, actionable data for the plurality of authors to a plurality of computing systems based in part or in whole upon the set of rules, wherein a rule provides how the actionable data is to be dispatched;

determining, at a computer system, contextual and semantic significance in the writings at least by performing classification and filtering on the writings of the plurality of authors;

identifying specific themes within the writings based in part or in whole upon topics and subjects revealed from the semantic analysis and the classification;

performing categorization on the topics and the subjects of the writings to create a number of categories;

associating a set of strength numbers with the number of categories, a strength number indicating relative affinity of each author of the plurality of authors to a particular topic, a particular subject, or a particular theme; and defining a vector for the each author using at least the set of strength numbers and the number of categories, a vector establishing an author profile for a specific author and being used to describe and analyze the specific author with respect to one or more affinities of the specific author.

9. The computer program product of claim 8, wherein an author profile comprises a vector comprising values for the topics of interest for an author.

10. The computer program product of claim 8, wherein the vector comprises strength numbers that correspond to an extent or degree of interest by the author for the topics of interest to the plurality of authors.

11. The computer program product of claim 8, in which the semantic analysis comprises a latent semantic analysis that analyzes contextual and semantic significance of terms that appear within the writings.

12. The computer program product of claim 8, wherein semantic filtering is performed to reduce irrelevant data.

13. The computer program product of claim 8, wherein multiple author profiles of the plurality of author profiles for multiple authors of the plurality of authors are correlated to identify commonality of interests.

14. The computer program product of claim 8, wherein actionable data is generated for a business using the plurality of author profiles.

15. The computer program product of claim 14, wherein the actionable data is supplied to an enterprise software system.

16. The computer program product of claim 15, wherein the enterprise software system comprises at least one of a customer relations management ("CRM") application, an enterprise resource planning ("ERP") application, and a supply chain management application.

17. The computer program product of claim 8, wherein the writings are retrieved from a social media system and comprise social media data.

18. The computer program product of claim 8, further comprising:

retrieving the writings, comprising social media data, from a social media system;

storing an author profile as a vector comprising (a) values for the topics of interest for an author and (b) strength numbers that correspond to an extent or degree of interest by the author for the topics of interest to the plurality of authors;

performing, as a part of the semantic analysis, a latent semantic analysis that analyzes contextual and semantic significance of terms that appear within the writings;

reducing irrelevant data through semantic filtering;

identifying commonality of interests by correlating multiple author profiles of the plurality of author profiles for multiple authors of the plurality of authors;

generating actionable data for a business using the author profile; and supplying the actionable data to an enterprise software system comprising at least one of a customer relations management ("CRM") application, an enterprise resource planning ("ERP") application, and a supply chain management ("SCM") application.

19. A computer system for analyzing author data, comprising:

a computer processor to execute a set of program code instructions; and a memory to hold the program code instructions, in which the program code instructions comprises program code to perform, wherein the program code instructions comprises instructions which, when executed by the computer processor, cause the computer processor at least to:

receive writings created by a plurality of authors, perform a semantic analysis upon the writings, generate a plurality of author profiles for the writings using results from the semantic analysis, the plurality of author profiles respectively identifying topics of interest to the plurality of authors, and groups of authors being identified from one or more of the topics of interest, and identify a first group of multiple authors that corresponds to a first topical subject and multiple author profiles for the multiple authors, the first group of multiple authors identified from the groups and corresponding to the multiple author profiles identified from the plurality of author profiles;

identify a second topical subject shared among at least some authors of the multiple authors in the first group at least by performing a correlation analysis that analyzes at least some author profiles in the multiple author profiles of the at least some authors;

identify a second group of authors from the plurality of authors that exhibit affinity for the second topical subject at least by identifying author vectors corresponding to the second group of authors with respect to the second topical subject; and correlate the first group of multiple authors with the second group of authors in response to the identification of the second topical subject, wherein the writings are received from the plurality of authors without targeting specific groups of authors;

classifying the writings into a plurality of classes based in part or in whole upon topics of interests determined by the semantic analysis, classifying the writing including:

creating a set of themes from results of the semantic analysis;

analyzing the set of themes created from the results of the semantic analysis;

determining subjects of the topics of interest based in part or in whole upon the set of themes;

determining similarity among the subjects of the topics of interest at least by analyzing the plurality of author profiles;

clustering the topics of interests into the plurality of classes based in part or in whole upon the similarity among the subjects;

determining respective strength numbers for the plurality of authors, a strength number for a user indicating relative affinity of the user to a category relative to one or more remaining categories;

associating the respective strength numbers that correspond to the plurality of authors with a plurality of categories;

creating a vector for each author of the plurality of authors, wherein vectors for the plurality of authors indicate respective affinities among the plurality of authors to one or more common topics of interests or one or more subjects;

establishing an author profile for the each author by using the vector for the each author;

storing the author profile for the author in the plurality of author profiles;

reducing noise in the writings at least by performing a semantic filtering process;

improving accuracy of the plurality of classes from classifying the writings at least by reducing false positives, false negatives, and inappropriate contents with the semantic filtering process;

identifying an actionable data based in part or in whole upon results of the semantic analysis, wherein the writings created by the plurality of authors include contents transcribed from non-social data;

determining, at a rule and workflow module stored at least partially in memory, the plurality of computing systems to receive the actionable data based in part or in whole upon a set of rules that identifies how the actionable data is to be handled and directed;

performing the semantic analysis upon the writings at least by performing a statistical language modeling;

performing the semantic analysis upon the writings at least by performing a latent semantic analysis;

preconfiguring a plurality of types of topics of interest;

determining a first set of authors that corresponds to the one or more first types of topics of interest at least by analyzing the plurality of author profiles to identify a first set of author profiles corresponding to the first set of authors;

determining commonality of one or more second types of topics of interest without pre-defining the one or more second types of topics of interest;

identifying commonality among the plurality of writings in response to the one or more second types of topics of interest based in part or in whole upon results of the semantic analysis;

identifying a group of authors that corresponds to a first affinity for a first subject;

determining a second affinity and a third affinity shared by at least a threshold percentage of authors of the group of authors at least by analyzing a set of author profiles corresponding to the group of authors and by performing one or more first correlation analyses, wherein the second affinity and the third affinity are not known or expected in advance;

generating correlation data based in part or in whole upon results of determining the second affinity and the third affinity;

generating an action for the group of authors based on the second affinity and the third affinity;

receiving the writings created by the plurality of authors without targeting one or more specific groups of authors;

generating the plurality of author profiles for the writings based in part or in whole upon respective strength numbers for the plurality of authors;

identifying a plurality of themes from the writings based in part or in whole upon results of the semantic analysis and results of classifying the writings;

performing a themes analysis;
generating the plurality of author profiles for the writing based in part or in whole upon the plurality of themes;
determining a first set of actionable data for the plurality of authors based in part or in whole upon results of correlating an at least one group with the authors;
identifying a set of rules from a rulebase;
dispatching, at a rules and workflow engine, actionable data for the plurality of authors to a plurality of computing systems based in part or in whole upon the set of rules, wherein a rule provides how the actionable data is to be dispatched;
determining, at a computer system, contextual and semantic significance in the writings at least by performing classification and filtering on the writings of the plurality of authors;
identifying specific themes within the writings based in part or in whole upon topics and subjects revealed from the semantic analysis and the classification;
performing categorization on the topics and the subjects of the writings to create a number of categories;
associating a set of strength numbers with the number of categories, a strength number indicating relative affinity of each author of the plurality of authors to a particular topic, a particular subject, or a particular theme; and
defining a vector for the each author using at least the set of strength numbers and the number of categories, a vector establishing an author profile for a specific author and being used to describe and analyze the specific author with respect to one or more affinities of the specific author.

20. The system of claim 19, wherein an author profile comprises a vector comprising values for the topics of interest for an author.

21. The system of claim 19, wherein the vector comprises strength numbers that correspond to an extent or degree of interest by the author for the topics of interest to the plurality of authors.

22. The system of claim 19, in which the semantic analysis comprises a latent semantic analysis that analyzes contextual and semantic significance of terms that appear within the writings.

23. The system of claim 19, wherein semantic filtering is performed to reduce irrelevant data.

24. The system of claim 19, wherein multiple author profiles of the plurality of author profiles for multiple authors of the plurality of authors are correlated to identify commonality of interests.

25. The system of claim 19, wherein actionable data is generated for a business using the author profile.

26. The system of claim 25, wherein the actionable data is supplied to an enterprise software system.

27. The system of claim 26, wherein the enterprise software system comprises at least one of a customer relations management ("CRM") application, an enterprise resource planning ("ERP") application, and a supply chain management application.

28. The system of claim 19, wherein the writings are retrieved from a social media system and comprise social media data.

29. The system of claim 19, wherein:
the writings are retrieved from a social media system and comprise social media data;
an author profile comprises a vector comprising values for the topics of interest for the author, and the vector comprises strength numbers that correspond to an extent or degree of interest by the author for the topics of interest to the plurality of authors;
the semantic analysis comprises a latent semantic analysis that analyzes contextual and semantic significance of terms that appear within the writings;
semantic filtering is performed to reduce irrelevant data;
multiple author profiles of the plurality of author profiles for multiple authors of the plurality of authors are correlated to identify commonality of interests; and
actionable data is generated for a business using the author profile and the actionable data is supplied to an enterprise software system comprising at least one of a customer relations management ("CRM") application, an enterprise resource planning ("ERP") application, and a supply chain management application.

* * * * *

UNITED STATES PATENT AND TRADEMARK OFFICE
CERTIFICATE OF CORRECTION

PATENT NO. : 9,607,340 B2  
APPLICATION NO. : 13/795699  
DATED : March 28, 2017  
INVENTOR(S) : Setayesh et al.

Page 1 of 1

It is certified that error appears in the above-identified patent and that said Letters Patent is hereby corrected as shown below:

In the Specification

In Column 3, Line 33, after "For example" insert -- , --.

In Column 6, Line 49, delete "PTSN," and insert -- PSTN, --, therefor.

In the Claims

In Column 10, Line 6, in Claim 8, delete "generating-a" and insert -- generating a --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*